UNITED STATES PATENT OFFICE.

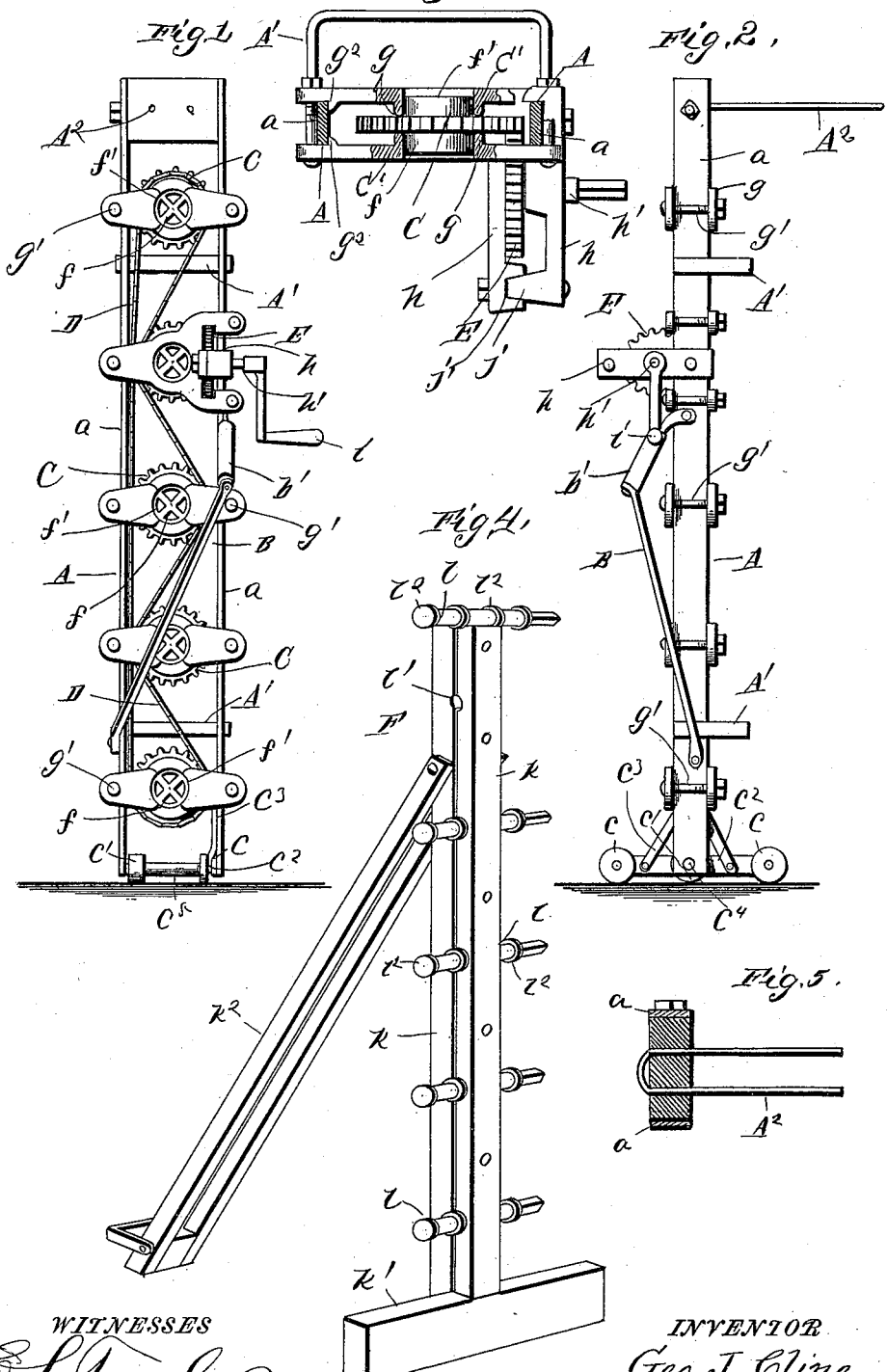

GEORGE J. CLINE, OF GOSHEN, INDIANA.

WIRE-FENCE MACHINE.

SPECIFICATION forming part of Letters Patent No. 419,502, dated January 14, 1890.

Application filed August 31, 1889. Serial No. 322,515. (No model.)

*To all whom it may concern:*

Be it known that I, GEORGE J. CLINE, a citizen of the United States, and a resident of Goshen, in the county of Elkhart and State of Indiana, have invented certain new and useful Improvements in Wire-Fence Machines; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a front elevation. Fig. 2 is a side elevation. Fig. 3 is a horizontal section, and Fig. 4 is a perspective view of the tension device.

This invention relates to certain improvements in fence-wire-twisting machines; and it consists in the construction and novel combination of parts, as will fully appear from the following description and accompanying illustration.

In accordance with my invention I employ an upright frame A, consisting, preferably, of two side bars or pieces $a$, suitably connected together at the upper end by a cross-head $a$, from which projects a bow-shaped spring $A^2$, to hold the pickets or slats while being woven into position between the wire to form the fence. From one side of the frame A project bails A' A', one near each end. For the convenient movement or manipulation of the frame I also employ a bail-like device B, which consists of two bars or arms of unequal length. One of these bars is connected at its lower end to one side bar of the frame and stands obliquely to the rear of the frame, its upper end being just at one side thereof. The other bar or arm connects at its upper end with the opposite side bar of the frame and extends slightly downward and outward, and is connected to one end of a hand-hold $b'$, to the other end of which is connected the upper end of said arm or bar. The frame A is supported, so as to be readily moved along the ground, upon small wheels $c\ c$ and a roll $c'$, the former being journaled, one at each end, to a plate-like bar $c^2$, centrally secured to one side bar of the frame at its lower end and braced in position by oblique bars $c^3$, secured to said plate-like bar $c^2$ and said side bar of the frame. The roll $c'$ is journaled upon a rod or shaft $c^4$, secured to the lower ends of the frame side bars, and is held at the opposite side of said frame to that supported by the wheels $c$ by a sleeve $c^5$, fitted upon said rod or shaft and extending to said roll.

C C are the wire-twisting heads or wheels, each having a series of apertures $f$, through which are passed the wires. These twisting heads or wheels are each formed upon its sides with a circular offset or boss $f'$, which bears in corresponding openings in opposite bearing-plates C', having offset arms $g$, which are connected together by bolts $g'\ g'$, also holding the plates C' upon the side bars of the frame A. The arms $g$ of the plates C' are cast upon their inner sides with opposite ledges or flanges $g^2$, against which rest the side bars $a\ a$ of the frame A. The twisting-heads C are provided upon their peripheries with a circular series of cogs or teeth, after the manner of sprocket-wheels, having in engagement therewith an endless chain belt D, to transmit motion from the upper or hand-driven twisting head or wheel to the others of the series. The belt D, which is passed in contact with said twisting-heads, as shown, thereby gives the required motion to each twisting-head.

E is a driving pinion or wheel, the teeth or cogs of which are isolated and engage similarly-arranged teeth or cogs of the uppermost twisting heads or wheel at the side inward from the outer ends thereof, which greatly simplifies the construction of the gearing over the ordinary bevel-gearing, and consequently lessens expense. Two arms project from one side of each of the bearing-plates C', between which is hung the upper twisting head or wheel, and intermediately or centrally of said arms are arranged at right angles with the side edges of the said plates parallel bearing plates or arms $h\ h$, bolted to the side bar of the frame A and to its fellow bar. Between the bearing plates or arms $h\ h$ are hung or journaled the driving pinion or wheel D, whose shaft $h'$ is fitted with a crank-handle $i$, to operate the twisting-heads. The inner side of one bearing plate or arm $h$ is provided with a spacing-stud $j$, which is received at its inner end in a socket $j'$ on the opposite plate or arm $h$.

F is the tension device, which consists of parallel uprights or posts $k$ $k$, suitably secured to a base $k'$, and upheld by an obliquely-disposed pivoted brace $k^2$, which is bifurcated, and embraces at its upper or pivoted end one of the posts or uprights $k$ $k$.

$l$ $l$ is a series of tension pins or keys let into suitable recesses or sockets $l'$ in one of the posts $k$ and held thereon by the other post $k$. Each pin or key $l$ has four circular flanges $l^2$ or ribs, including its head-flange, two retaining the key or pin in position against endwise displacement, while between the one next to the outer end of the pin or key and the adjacent one is wound the wire, and by adjusting said pins or keys it will be seen that the tension of the wire is readily regulated.

Having described this invention, what I claim, and desire to secure by Letters Patent, is—

1. In a fence-wire-twisting machine, the combination of the toothed driving pinion or wheel, the series of toothed twisting-heads, and the sprocket chain or belt, the teeth of the twisting-head engaging the teeth of the driving pinion or wheel, also engaging the links of said belt or chain, substantially as set forth.

2. In a fence-machine, the combination, with the side bars of the supporting-frame, of the twisting-heads, each having a central series of peripheral cogs and means for driving the same, the parallel bearing-plates bolted together upon said side bars and having opposite offset bosses, between which stand said series of cogs, and flanges, against which rest the said side bars, substantially as set forth.

3. The fence-machine having the parallel uprights, one having sockets or recesses, and the series of tension pins or keys having circular flanges or ribs, arranged one at each side of the said uprights and one at each end of the cylindric portions of the keys or pins, thus providing for winding the wire on the latter outside of the uprights, said uprights having a suitable supporting-base and a bifurcated pivoted brace, substantially as set forth.

In testimony whereof I affix my signature in presence of two witnesses.

GEORGE J. CLINE.

Witnesses:
   LOU W. VAIL,
   JOSEPH A. BEANE.